(12) United States Patent
Farrell et al.

(10) Patent No.: US 10,062,333 B2
(45) Date of Patent: Aug. 28, 2018

(54) BACKLIGHT CONTROL AND DISPLAY MAPPING FOR HIGH DYNAMIC RANGE IMAGES

(71) Applicant: Dolby Laboratories Licensing Corporation, San Francisco, CA (US)

(72) Inventors: Suzanne Farrell, Mountain View, CA (US); Scott Daly, Kalama, WA (US); Robin Atkins, Campbell, CA (US); Timo Kunkel, Kensington, CA (US); Kimball Darr Thurston, III, Los Angeles, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 58 days.

(21) Appl. No.: 15/286,126

(22) Filed: Oct. 5, 2016

(65) Prior Publication Data
US 2017/0025074 A1 Jan. 26, 2017

Related U.S. Application Data

(63) Continuation-in-part of application No. PCT/US2016/031920, filed on May 11, 2016.
(Continued)

(30) Foreign Application Priority Data
Jun. 8, 2015 (EP) .................................... 15171033

(51) Int. Cl.
*G09G 5/10* (2006.01)
*G09G 3/34* (2006.01)
*G06K 9/00* (2006.01)

(52) U.S. Cl.
CPC ....... *G09G 3/3406* (2013.01); *G06K 9/00711* (2013.01); *G09G 3/34* (2013.01);
(Continued)

(58) Field of Classification Search
CPC .. G09G 3/3406; G09G 3/34; G09G 2320/066; G09G 2320/0233;
(Continued)

(56) References Cited

U.S. PATENT DOCUMENTS

| 5,717,422 A | 2/1998 | Fergason |
| 6,683,657 B1 | 1/2004 | Miyawaki |

(Continued)

FOREIGN PATENT DOCUMENTS

| WO | 2013/130478 | 9/2013 |
| WO | 2014/116715 | 7/2014 |

(Continued)

OTHER PUBLICATIONS

Tsai, Pei-Shan, et al "Image Enhancement for Backlight-Scaled TFT-LCD Displays" IEEE Transactions on Circuits and Systems for Video Technology, vol. 19, Issue 4, Apr. 2009, pp. 574-583.
(Continued)

*Primary Examiner* — Srilakshmi K Kumar
*Assistant Examiner* — Brent D Castiaux
(74) *Attorney, Agent, or Firm* — Konstantinos Konstantinides (57) ABSTRACT

Systems and methods are disclosed for dynamically adjusting the backlight of a display during video playback or for generating filtered video metadata. Given an input video stream and associated metadata values of minimum, average, or maximum luminance values of the video frames in the video stream, values of a function of the frame min, mid, or max luminance values are filtered using a temporal filter to generate a filtered output value for each frame. At least one filtering coefficient of the temporal filter is adapted based on a logistic function controlled by slope and sensitivity values. The instantaneous dynamic range of a target display is determined based on the filtered metadata values
(Continued)

and the minimum and maximum brightness values of the display.

15 Claims, 3 Drawing Sheets

Related U.S. Application Data (60) Provisional application No. 62/193,678, filed on Jul. 17, 2015, provisional application No. 62/160,353, filed on May 12, 2015.

(52) U.S. Cl.
CPC ............ *G09G 2320/0233* (2013.01); *G09G 2320/0247* (2013.01); *G09G 2320/0271* (2013.01); *G09G 2320/0276* (2013.01); *G09G 2320/064* (2013.01); *G09G 2320/066* (2013.01); *G09G 2320/0646* (2013.01); *G09G 2320/0653* (2013.01); *G09G 2320/103* (2013.01); *G09G 2340/16* (2013.01); *G09G 2360/16* (2013.01); *G09G 2370/04* (2013.01)

(58) Field of Classification Search
CPC ..... G09G 2320/064; G09G 2320/0653; G09G 2320/0646; G09G 2320/0276; G09G 2320/0271; G09G 2320/0247; G09G 2320/103; G09G 2340/16; G09G 2360/16; G09G 2370/04; G06K 9/00711
See application file for complete search history.

(56) References Cited

U.S. PATENT DOCUMENTS

| | | | |
|---|---|---|---|
| 6,795,053 | B1 | 9/2004 | Funamoto |
| 8,125,702 | B2 | 2/2012 | Ward |
| 8,493,313 | B2 | 7/2013 | Damberg |
| 8,593,480 | B1 | 11/2013 | Ballestad |
| 9,462,215 | B2 | 10/2016 | Gorny |
| 2004/0201561 | A1 | 10/2004 | Funamoto |
| 2005/0104840 | A1 | 5/2005 | Sohn |
| 2007/0183678 | A1 | 8/2007 | Sankar |
| 2007/0201746 | A1 | 8/2007 | Kim |
| 2008/0074372 | A1* | 3/2008 | Baba ............... G09G 3/3406 345/89 |
| 2009/0016672 | A1 | 1/2009 | Schmidt |
| 2009/0141178 | A1* | 6/2009 | Kerofsky ........... G09G 3/3426 348/700 |
| 2009/0184917 | A1 | 7/2009 | Park |
| 2012/0038693 | A1 | 2/2012 | Kang |
| 2012/0120089 | A1 | 5/2012 | Byun |
| 2012/0299973 | A1* | 11/2012 | Jaffari ............... G09G 3/3208 345/690 |
| 2013/0147777 | A1 | 6/2013 | Lau |
| 2013/0148037 | A1 | 6/2013 | Whitehead |
| 2014/0078165 | A1* | 3/2014 | Messmer ............ H04N 1/603 345/589 |
| 2014/0359185 | A1* | 12/2014 | Sawal ............... G06F 13/128 710/264 |
| 2016/0261832 | A1 | 9/2016 | Gorny |

FOREIGN PATENT DOCUMENTS

| | | |
|---|---|---|
| WO | 2014/176019 | 10/2014 |
| WO | 2015/017314 | 2/2015 |
| WO | 2016/118395 | 7/2016 |

OTHER PUBLICATIONS

Kim, Eun-Su, "Dynamic Adaptation Model and Equal-Whiteness CCT Curves for the Choice of Display Reference White" Journal of the Society for Information Display, vol. 17, Issue 9, pp. 771-776, Sep. 2009.

Kerofsky, L. et al "Brightness Preservation for LCD Backlight Dimming" Journal of the Society for Information Display, vol. 14, Issue 12, Dec. 2006, pp. 1111-1118.

Park, Hyun-Sang et al "Ambient-Light Sensor System with Wide Dynamic Range Enhanced by Adaptive Sensitivity Control" Journal of the Society for Information Display, vol. 17, Issue 8, pp. 681-686, Aug. 2009.

ITU-R BT.1886 "Reference Electro-Optical Transfer Function for Flat Panel Displays used in HDTV Studio Production", Mar. 2011, pp. 1-11.

SMPTE Standard 2084:2014 "High Dynamic Range Electro-Optical Transfer Function of Mastering Reference Displays" pp. 1-14.

Pattanaik, S.N. et al "Time-Dependent Visual Adaptation for Fast Realistic Image Display" Proc. of Siggraph 27th annual conference on Computer Graphics and Interactive Techniques pp. 47-54, Jul. 23-28, 2000.

Atkins, Robins "Advanced Methods for Controlling Dual Modulation Display Systems" Thesis submitted to University of British Columbia, Feb. 2012.

Lee, Seong-Whan Lee et al "Fast Scene Change Detection Using Direct Feature Extraction from MPEG compressed Videos" IEEE Transactions on Multimedia, vol. 2, Issue 4, Dec. 2000, pp. 240-254.

Zhou, J. et al "A Web-enabled Video Indexing System" Proc. of the 6th ACM Sigmm International Workshop on Multimedia Information Retrieval, Oct. 15-16, 2004, pp. 307-314.

Ling, X. et al "A Method for Fast Shot Boundary Detection Based on SVM" Image and Signal Processing, CISP, May 27, 2008, pp. 445-449.

Tian-Tsong NG et al "Identifying and Prefiltering Images" IEEE Signal Processing Magazine, vol. 26, No. 2, Mar. 1, 2009, pp. 49-58.

\* cited by examiner

BACKLIGHT CONTROL AND DISPLAY MAPPING FOR HIGH DYNAMIC RANGE IMAGES

CROSS-REFERENCE TO RELATED APPLICATIONS

This application is a continuation in part of PCT Application Ser. No. PCT/US2016/031920, filed on May 11, 2016, which claims the benefit of priority to U.S. Provisional Patent Application Ser. No. 62/160,353, filed on May 12, 2015, U.S. Provisional Patent Application No. 62/193,678, filed on Jul. 17, 2015 and European Patent Application No. 15171033.2, filed on Jun. 8, 2015, each of which is incorporated herein by reference in its entirety.

TECHNOLOGY

The present invention relates generally to images. More particularly, an embodiment of the present invention relates to backlight control and display mapping for images and video sequences with high dynamic range.

BACKGROUND

As used herein, the term 'dynamic range' (DR) may relate to a capability of the human visual system (HVS) to perceive a range of intensity (e.g., luminance, luma) in an image, e.g., from darkest darks (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). While SDR images can typically be encoded with 8-10 bits per color component, EDR and HDR images typically require more than 8 bits (e.g., 10-12 bits, or more). EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (Mar. 2011), which is included herein by reference in its entity, defines the reference EOTF for flat panel displays based on measured characteristics of the Cathode Ray Tube (CRT). Given a video stream, any ancillary information is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer HDTVs range from 300 to 500 nits with new models reaching 1000 nits ($cd/m^2$). As the availability of HDR content grows due to advances in both capture equipment (e.g., cameras) and displays (e.g., the PRM-4200 professional reference monitor from Dolby Laboratories), HDR content may be color graded and displayed on displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure relate to any dynamic range higher than SDR. As appreciated by the inventors here, improved techniques for the display of high-dynamic range images are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Techniques for backlight control and display management or mapping of high dynamic range (HDR) images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to generating temporally consistent metadata for HDR images. In an embodiment, given an input video stream, a processor accesses a first metadata value related to pixels values of the input video stream (e.g., min, mid, or max luminance values in a scene). For a current frame, it computes a current frame parameter value based on pixel values in the current frame. It computes a delta value based on the current frame parameter value and the first metadata value. It computes a filtering coefficient for a temporal filter based on the delta value, a slope value, a sensitivity value, and a logistic function. It applies the temporal filter to the current frame parameter value to generate an updated (filtered) metadata value based on the first metadata value and the current frame parameter. The instantaneous dynamic range of a target display (e.g., as defined by a minimum and maximum luminance values of the display at the desired brightness) is determined based on the filtered metadata value and the minimum and maximum brightness values of the display.

In an embodiment, a backlight control level is computed based on the instantaneous dynamic range, and the input signal is tone mapped by a display management process to generate a tone-mapped output to be displayed within the selected instantaneous dynamic range. The design of a temporal filter based on an exponential moving average filter and optional scene-change detection is presented.

Example Display Control and Display Management

Figure 1:
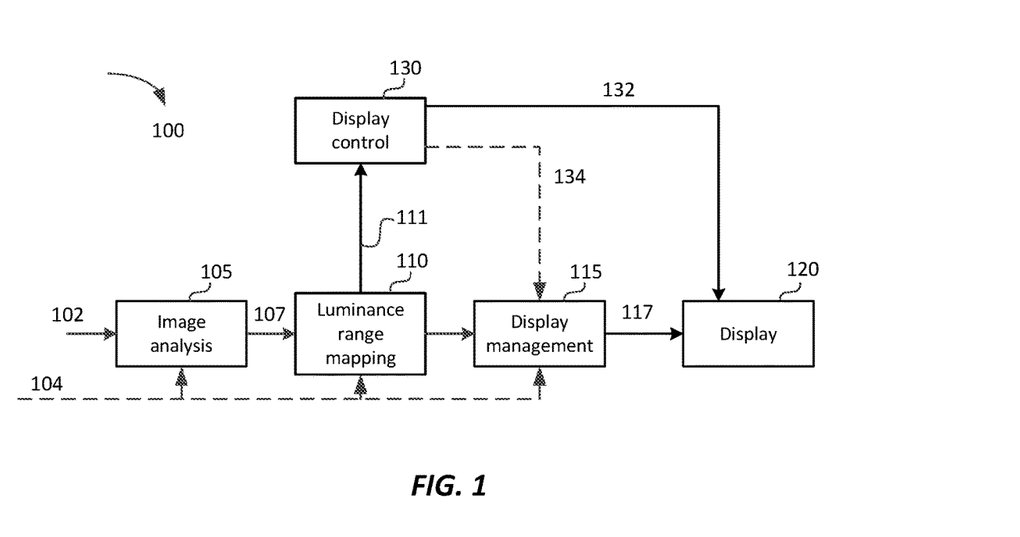
FIG. 1 depicts an example process for backlight control and display management according to an embodiment of this invention.

FIG. 1 depicts an example process (100) for display control and display management according to an embodiment. Input signal (102) is to be displayed on display (120). Input signal may represent a single image frame, a collection of images, or a video signal. Image signal (102) represents a desired image on some source display typically defined by a signal EOTF, such as ITU-R BT. 1886 or SMPTE ST 2084, which describes the relationship between color values (e.g., luminance) of the input video signal to output screen color values (e.g., screen luminance) produced by the target display (120). The display may be a movie projector, a television set, a monitor, and the like, or may be part of another device, such as a tablet or a smart phone.

Process (100) may be part of the functionality of a receiver or media player connected to a display (e.g., a cinema projector, a television set, a set-top box, a tablet, a smart-phone, and the like), where content is consumed, or it may be part of a content-creation system, where, for example, input (102) is mapped from one color grade and dynamic range to a target dynamic range suitable for a target family of displays (e.g., televisions with standard or high dynamic range, movie theater projectors, and the like).

In some embodiments, input signal (102) may also include metadata (104). These can be signal metadata, characterizing properties of the signal itself, or source metadata, characterizing properties of the environment used to color grade and process the input signal (e.g., source display properties, ambient light, coding metadata, and the like).

In some embodiments (e.g., during content creation, as in live broadcasting, television and/or movie post-production, and the like), process (100) may also generate metadata which are embedded into the generated tone-mapped output signal. A target display (120) may have a different EOTF than the source display. A receiver needs to account for the EOTF differences between the source and target displays to accurate display the input image. Display management (115) is the process that maps the input image into the target display (120) by taking into account the two EOTFs as well as the fact that the source and target displays may have different capabilities (e.g., in terms of dynamic range.)

As used herein, the terms "display management" or "display mapping" denote the processing (e.g., tone and gamut mapping) required to map an input video signal of a first dynamic range (e.g., 1000 nits) to a display of a second dynamic range (e.g., 500 nits). Examples of display management processes can be found in U.S. Provisional Patent Application Ser. No. 62/105,139 (to be referred to as the '139 application), filed on Jan. 19, 2015, titled "Display management for high dynamic range images," filed also on Jan. 14, 2016, as PCT Application Ser. No. PCT/US2016/013352, which is incorporated herein by reference in its entirety.

In some embodiments, the dynamic range of the input (102) may be lower than the dynamic range of the display (120). For example, an input with maximum brightness of 100 nits in a Rec. 709 format may need to be color graded and displayed on a display with maximum brightness of 1,000 nits. In other embodiments, the dynamic range of input (102) may be the same or higher than the dynamic range of the display. For example, input (102) may be color graded at a maximum brightness of 5,000 nits while the target display (120) may have a maximum brightness of 1,500 nits.

In an embodiment, display (120) is controlled by display controller (130). Display controller (130) provides display-related data (134) to the display mapping process (115) (such as: minimum and maximum brightness of the display, color gamut information, and the like) and control data (132) for the display, such as control signals to modulate the backlight or other parameters of the display for either global or local dimming. An example of a display controller for dual modulation display systems is described in U.S. Pat. No. 8,493,313, "Temporal filtering of video signals," by G. Damberg and H. Seetzen, which is incorporated herein by reference in its entirety. Another example is described in PCT Application Ser. No. PCT/US2014/012568 (WO 2014/116715A1), filed on Jan. 22, 2014, "Global display management based light modulation," by T. Kunkel, which is incorporated herein by reference in its entirety.

Figure 2:
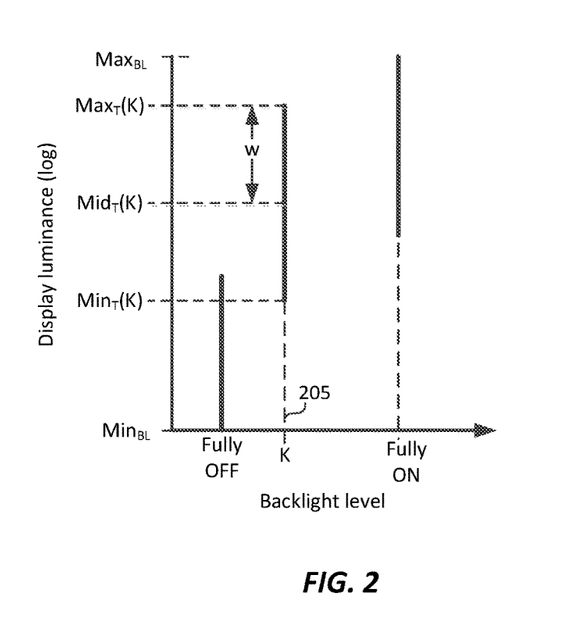
FIG. 2 depicts an example relationship between a backlight setting and the instantaneous dynamic range for a display with dynamic range control.

Displays using global or local backlight modulation techniques adjust the backlight based on information from input frames of the image content and/or information received by local ambient light sensors. For example, for relatively dark images, the display controller (130) may dim the backlight of the display to enhance the blacks. Similarly, for relatively bright images, the display controller may increase the backlight of the display to enhance the highlights of the image. For example, FIG. 2 depicts a display with a full dynamic range of $Max_{BL}/Min_{BL}$, where $Max_{BL}$ denotes the maximum possible luminance of the display when the backlight is full on (e.g., 1,000 nits), and $Min_{BL}$ denotes the minimum possible luminance of the display when the backlight is full off (e.g., 0.001 nits). Note that, for illustration purposes, the Y axis of FIG. 2 depicts log luminance values. As used herein, the term "instantaneous dynamic range" denotes a simultaneous (or static) dynamic range, that is the range of black (e.g., $Min_T(K)$) to white (e.g., $Max_T(K)$) that can be shown simultaneously on a display for a given backlight level (K) at some instance of time. Let $Max_T(K)/Min_T(K)$ (e.g., 1,000:1) denote the instantaneous (also referred to as static) dynamic range of the display (120) for a specific level K (205) of backlight between full off and full on, then display management (115) maps the dynamic range of the input (102) into the range ($Min_T(K)$, $Max_T(K)$) of the display. The instantaneous dynamic range ratio $Max_T(K)/Min_T(K)$ may be fixed or approximately the same for all values of K. For example, for an instantaneous dynamic range of 1,000:1, w=log(1,000)/2=1.5.

In an embodiment, the display mapping (115) and display control (130) processes are enhanced by suitable image analysis (105) and image processing (110) operations as will be described herein.

Image Analysis

In an embodiment, unless specified already by the source metadata (104), for each input frame in signal (102) the image analysis (105) block may compute its minimum (min), maximum (max), and median (mid) (or average gray) luminance value. These values may be computed for the whole frame or part of a frame. In some embodiments, min, mid, and max luminance values may represent approximate values of the true values. For example, computed min and max values may represent 90% of the true min and max values in the input signal so as to be more robust to single pixel outliers.

In some embodiment, min, mid, and max luminance signal values may also be computed or received as metadata for a whole scene. As used herein, the terms 'scene' or 'shot' denote a series of sequentially-in-time captured sequence frames that may share the same overall color or brightness characteristics. Scene cuts may be determined automatically or they may be denoted in the bitstream using metadata. For example, let $Mid_{S1}$ and $Mid_{S2}$ denote respectively the mid luminance values for two consecutive scenes S1 and S2, then, in an embodiment a scene cut may be determined if:

$$Mid_{S1} - Mid_{S2} \neq 0, \quad (1)$$

or $$|Mid_{S1} - Mid_{S2}| > T_F,$$

where $T_F$ is a predefined threshold (e.g., $T_F$=0.1).

Target Display Luminance Range Mapping

Given min, mid, and max luminance source data (107 or 104), image processing block (110) may compute the display parameters (e.g., $Min_T$ and $Max_T$, or the level K of backlight) that allow for the best possible environment for displaying the input video. Due to brightness fluctuations even within frames in the same scene, in an embodiment, a temporal filter is applied to a sequence of sequential frames in the scene to determine the best luminance mapping (e.g., $Min_T$ and $Max_T$). In a preferred embodiment, luminance mapping employs a temporal filter based on an exponential moving average (EMA) filter; however, other FIR or IIR temporal filters could be applied as well. In some embodiments, temporal filtering and other aspects of luminance range mapping (110) may applied at the source display, and the filter output data may be passed to the target display as metadata. This allows for fewer computations at the target display and additional creative control by the content provider. For example, the content creator (e.g., a director or a color grader) may decide to override the results of the filter output (110) to manually adjust how the image is displayed.

Let $L_{F(t)}$ denote a function of min, mid, and max luminance values in a frame at time t in a scene. In an embodiment $L_{F(t)}$ may be simply the mid luminance value of a frame at time t in a scene (e.g., $L_{F(t)}=Mid_{F(t)}$). In other embodiments, $L_{F(t)}$ may represent the min or max values, or a weighted combination of the min, mid, and max values. Then, in an embodiment, EMA filtering in a scene may be expressed as:

$$S_0 = L_{F(0)}, \text{ for } t=0,$$

$$S_t = \alpha * L_{F(t)} + \beta * S_{t-1}, \text{ for } t>0, \quad (2)$$

where $\alpha$ and $\beta$ denote weight factors.

In an embodiment, $$\beta = 1 - \alpha.$$

In some embodiments, the weights may be fixed (e.g., $\alpha$=0.25, $\beta$=0.75). In some embodiments $\beta$ may be defined to be a function of time. For example, in an embodiment:

$$\beta = 0, \text{ for } t = 0 \quad (3)$$

$$\beta = clip3\left(0, \frac{1-\alpha}{t}, (1-\alpha)\right), \text{ for } 0 < t \leq m,$$

$$\beta = clip3\left(0, \frac{1-\alpha}{m}, (1-\alpha)\right), \text{ for } t > m,$$

where m>0 is a predetermined time instant and clip3(a,f(x), c) denotes that the output of f(x) is always clipped to be within the values of a and c, where a and c are included.

In a preferred embodiment:

$$\alpha = \min(1, \text{SceneCut} * |S_{t-1} - L_{F(t)}| * \alpha_{scene} + \alpha_{base}), \quad (4)$$

where SceneCut is in the range (0, 1) and denotes the confidence (or probability) in detecting a scene cut. For example, SceneCut=1 may specify there is a new scene with full confidence. Parameters $\alpha_{scene}$ and $\alpha_{base}$ denote predefined filter parameters that control how fast the filter adapts. In an embodiment, without limitation, typical ranges for these variables include $\alpha_{scene}$=(2.0, 5.0) and $\alpha_{base}$=(0.02, 0.2) (e.g., $\alpha_{scene}$=3.0 and $\alpha_{base}$=0.05). Hence, when a new scene is detected, the value of $\alpha$ may be increased proportionally to the change of the scene-related metadata (e.g., the average scene luminance) to make smoother the transition between the adjustment in mid brightness values. In some embodiments, in equation (4), $S_{t-1}$ may also be substituted with $L_{F(t-1)}$. From equations (2)-(4), when a new scene is detected, $\alpha$ is getting very close to one and the value of $\beta$ is close to zero, hence, the current $L_{F(t)}$ values are weighted more than past filtered values. In addition, when a new scene cut is detected, t may be reset to 0, and all of the previous $S_t$ values may be cleared from the memory. In other words, optionally, the memory of the temporal filter may be reset to zero every time there is a scene cut.

Let $Min_S$, $Mid_S$, and $Max_S$ denote the brightness characteristics of a source or reference display, and let $Min_T$, $Mid_T$, and $Max_T$ denote the brightness characteristics of the target display (120), then, as described by A. Ballestad et al., in U.S. Pat. No. 8,593,480, titled "Method and apparatus for image data transformation," which is incorporated herein by reference in its entirety, these values may define the anchor points of a sigmoid-like, tone-mapping function, which together with other tone-mapping operations (e.g., as described in the '139 application) enable the display management process (115) to generate a tone-mapped output (117) to be displayed on the target display (120).

In an embodiment, given the results of the temporal filter (e.g., equation (2)), the preferred instantaneous luminance range for the target display (120) may be computed as $$\text{Max}_T = \text{clip3}(\text{Min}_{BL}, f_{max}(S_t), \text{Max}_{BL}),$$

$$\text{Min}_T = \text{clip3}(\text{Min}_{BL}, f_{min}(S_t), \text{Max}_{BL}), \quad (5)$$

where $f_{max}(S_t)$, and $f_{min}(S_t)$, denote functions to determine the max and min values of the preferred instantaneous dynamic range of the target display based on one or more limit luminance values for the target display (e.g., $\text{Min}_{BL}$, $\text{Max}_{BL}$). For example, without limitation, assuming all display luminance values and $S_t$ are in expressed in a linear domain (shown with an overbar) (e.g., $\overline{\text{Max}_{BL}} = 10^{\text{Max}_{BL}}$ when $\text{Max}_{BL}$ is in log 10 domain), let $\overline{w}$ denote one half of the instantaneous dynamic range in the linear domain (e.g., see FIG. 2). Then, if $$\overline{S_t} = \text{clip3}\left(\overline{\text{Min}_{BL}} * \overline{w}, \overline{S_t}, \frac{\overline{\text{Max}_{BL}}}{\overline{w}}\right),$$

then $$\overline{\text{Max}_T} = \overline{f_{max}}(\overline{S_t}) = \overline{S_t} * \overline{w},$$

$$\overline{\text{Min}_T} = \overline{f_{min}}(\overline{S_t}) = \overline{S_t}/\overline{w}. \quad (6)$$

If $S_t$ values are computed in a gamma or other perceptually-quantized luminance space, then they may have to be linearized first. Alternatively, equations (5)-(6) may also be computed in a logarithmic domain. For example, assuming all luminance values are expressed in logarithmic space, let w in denote one half of the instantaneous dynamic range in the logarithmic domain. Then if $$\log(S_t) = \text{clip3}(\text{Min}_{BL} + w, \log(S_t), \text{Max}_{BL} - w),$$

then $$\text{Max}_T = f_{max}(S_t) = \log(S_t) + w,$$

$$\text{Min}_T = f_{min}(S_t) = \log(S_t) - w. \quad (7)$$

For example, let a display have $\overline{\text{Max}_{BL}} = 1,000$ nits, $\overline{\text{Min}_{BL}} = 0.001$ nits, and an instantaneous dynamic range of 1,000:1. Then $\text{Max}_{BL} = 3$, $\text{Min}_{BL} = -3$, $w = \log(1,000)/2 = 1.5$, and $\overline{w} = \sqrt{1000} = 31.62$.

Given the $\text{Min}_T$ and $\text{Max}_T$ values (111) computed by equations (6) or (7), the display controller (130) may then apply a look-up table or other internal-control processes to determine the appropriate level K for controlling the display's backlight. Alternatively, in a content-creation environment, $S_t$-related values or one or more of the computed $\text{Min}_T$ and $\text{Max}_T$ values or a function of these values (e.g., $\text{Mid}_T$) may be embedded as metadata in the tone-mapped bitstream to be delivered downstream to content consumers. Hence, a receiver with low computational resources, such as a tablet or a smartphone, may use directly these values to determine the best display setup.

Figure 3:
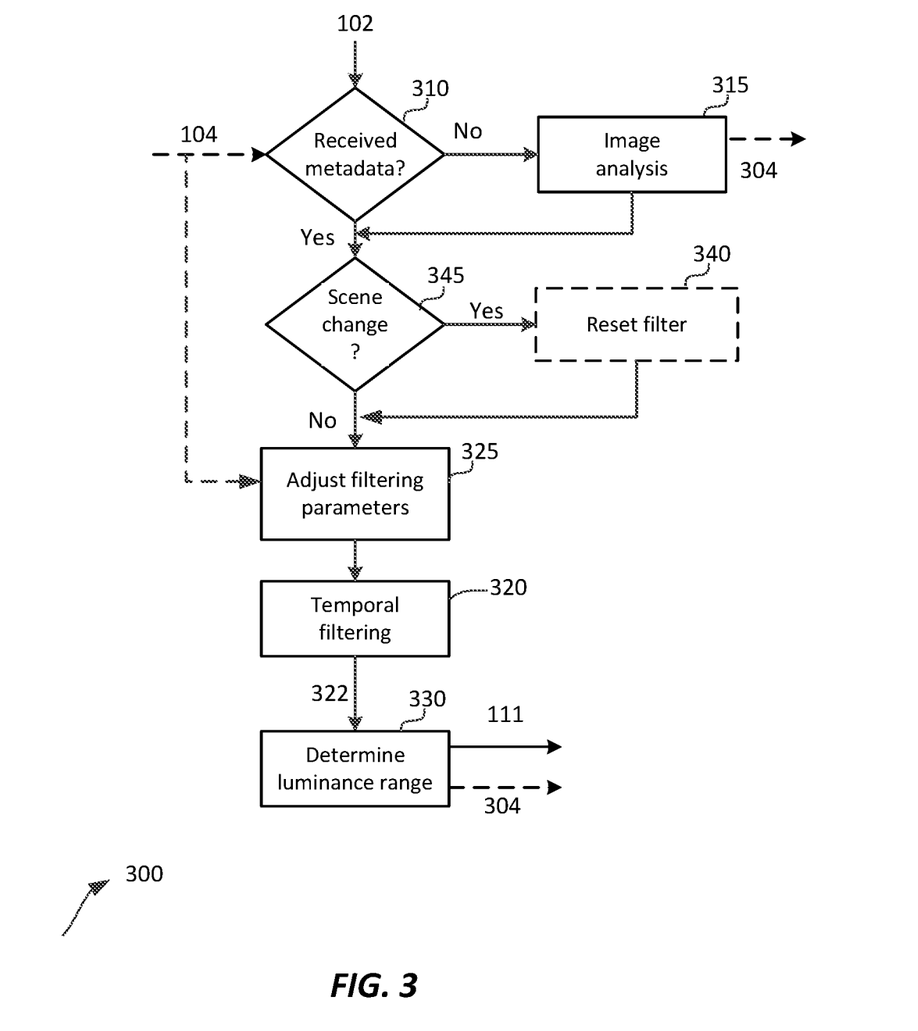
FIG. 3 depicts an example process for adaptive luminance range mapping according to an embodiment.

FIG. 3 depicts an example process for adjusting the instantaneous luminance range mapping according to an embodiment. Given input (102) and associated metadata (104), step (310) determines whether luminance-related metadata values (e.g., min, med, and max) for each frame are available. If there are no relevant metadata, then these values may be computed in step (315). In some embodiments, computing luminance-related metadata in (315) may also require a luminance linearization step, where a gamma or other non-linear mapping (as specified by the source's EOTF) is removed to generate data with linear luminance. In some embodiments, the results of image analysis (315) may also be stored and/or passed downstream as signal-related metadata (304). Next, in step (345), it is determined whether the current frame starts a new scene. If there is a scene change, optionally, in step (340), the temporal filter may also be fully reset (e.g., the memory of all past $S_t$ filter output values is cleared and t is set to zero). Next, in step (325), the parameters of the temporal filter are adjusted as needed (e.g., equations (3) and (4)) and the process continues with the temporal filtering (320) (e.g., equation (2)) of values of the $L_{F(t)}$ function of these metadata values. In step (330), the results (322) of the temporal filtering (e.g., $S_t$) are used to determine the proper instantaneous luminance range (111) (e.g., $\text{Min}_T$ and $\text{Max}_T$) to display the input data (102) on the target display. Appropriate data (111) are passed to the display controller (130) and the display management process (115). Optionally, related metadata (304) (e.g., the filtered $L_{F(t)}$ values for each frame) may be saved to be stored together with the modified (tone-mapped) by the display management bitstream to be passed to other downstream components.

While example embodiments have been presented for optimizing the display of images (either of standard dynamic range (SDR) or high dynamic range) on high-dynamic range displays, the same techniques may also be applied to improve SDR displays. For example, when viewing a display under high ambient light (e.g., a tablet or smartphone in day light), the techniques may be used to compensate for the low dynamic range caused by the high ambient light and the display's reflectivity parameters.

Real-time and Low-latency Considerations

In some real-time, or "live", workflow scenarios in video streaming, such as in live sports broadcasting, it important to minimize latency. As explained earlier, when displaying HDR data, users get a better viewing experience when the HDR display utilizes metadata that is temporally consistent. In a movie or a pre-recorded TV show workflow, there is the ability to see all of the video, future and past, and allows the production of such time-consistent metadata to be optimized on a per scene or shot basis. However, live workflows cannot predict the future video well, so other mechanisms should be employed for optimum metadata generation.

As described earlier, in some embodiments (e.g., (300)), one may filter metadata values with a temporal or "recursive" filter with a fixed alpha (a) filtering coefficient (e.g., see equation (2)). In some embodiments, one may also add a scene-cut or scene-change detection step to detect large jumps in the video characteristics. However, scene-cut algorithms are prone to false positive and false negative triggers—adding a scene cut when there isn't one or missing one where there is one. Missing a scene change is typically not an issue, as that usually will be compensated during the filtering of metadata values; however, a false positive case may cause a sudden change in metadata values in the middle of a sequence. This can cause jarring jumps in values that are displeasing to the viewer. Furthermore, adding a scene-detection stage requires additional latency.

In an embodiment, to avoid these jumps, the filtering coefficient of the metadata temporal filter (e.g., its alpha value) may be adjusted based on a generalized logistic function. In its general form, the logistic function g(x) is defined as $$g(x) = \frac{L}{1 + e^{-k(x-x_0)}}, \quad (8)$$

where L denotes its maximum value, $x_0$ denotes its midpoint, and k represents the steepness of the function.

The logistic function g(x) is commonly used to divide or classify data sets. For example, for $0 \le g(x) \le 1$, if $g(x) > 0.5$, then one may decide to select a set B, otherwise one may select a set A. In an embodiment, instead of making a binary decision whether there is a scene cut or not, the output of g(x) represents the likelihood of having a scene cut at the current frame. Therefore, under strong scene changes, alpha will react quickly, but otherwise it will be varying more slowly.

In an embodiment, a separate logistic function may be used for each metadata parameter. For example, when in a scene a flash bulb goes off, it may cause a large jump in the maximum luminance value; however, the black levels may still remain the same, hence one might decide to adjust the filtering parameters differently across the min, mid, and max luminance values, or any other metadata values of interest.

Figure 4:
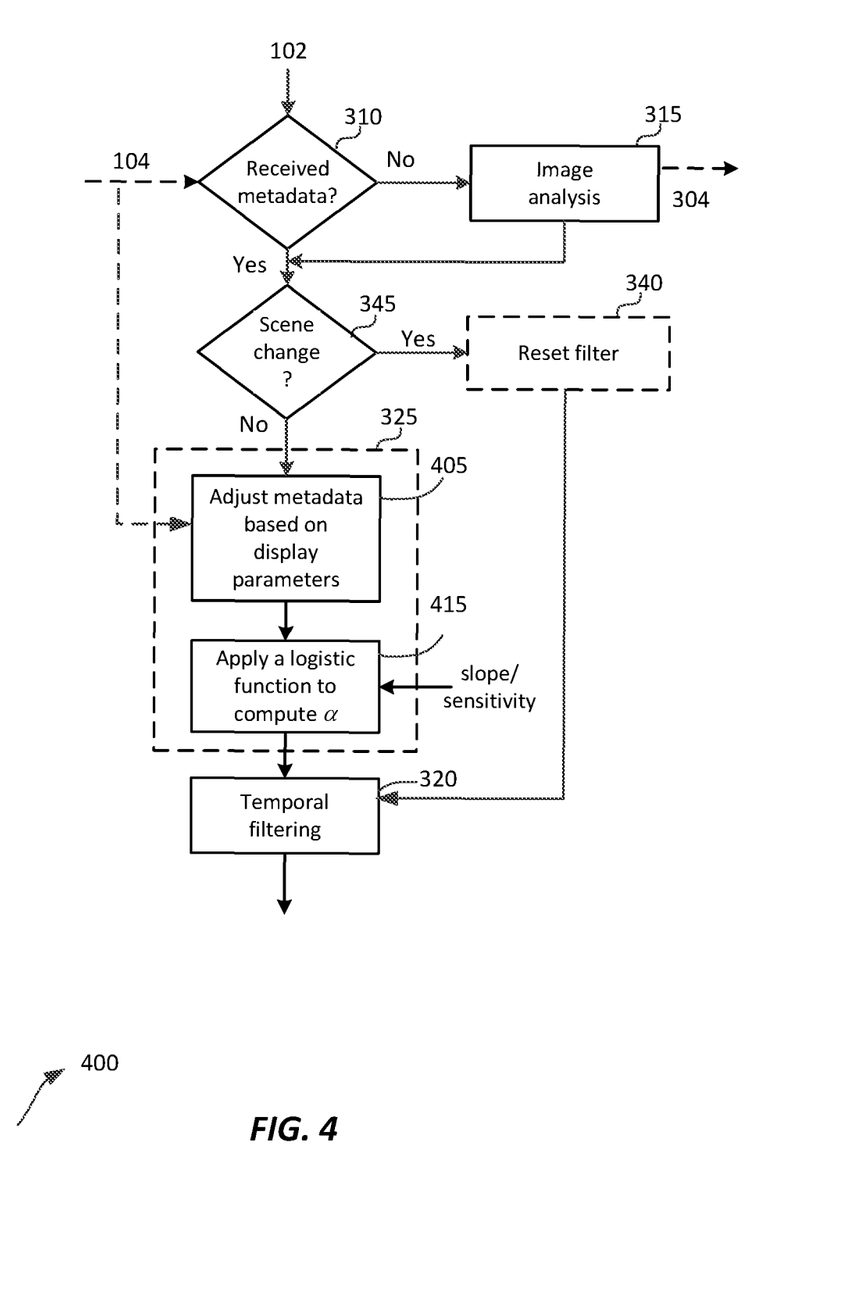
FIG. 4 depicts an example process for real-time adaptive metadata filtering using a logistic function.

FIG. 4 depicts an example process (400) for real-time metadata filtering according to an embodiment when using a logistic function. Up to entering the "adjust filtering parameters" (325) step, the process (400) is identical to process (300). Upon entering processing step (325), in an embodiment, the following steps may be performed:

Keep a running state of the current metadata variables under consideration, say, the min, mid, and max luminance values in the input frames, as computed by image analysis block (315)

Compute new metadata variables (e.g., new_min, new_mid, and new_max) based on the current frame only In step (405), optionally, adjust the new metadata variables based on the target display characteristics. For example, given $$Tav = \frac{T_U + T_L}{2}, \quad (9)$$

where $T_U$ and $T_L$ denote the upper and lower brightness levels of the target display display, one may adjust the new_min and new_max values as follows:

if(new_min>*Tav*)new_min=*Tav*;

if(new_max<*Tav*)new_max=*Tav*; (10)

Such adjustments help making sure that the current metadata values are not outliers which can put the target display in a very bright or very black mode from where it is very slow to recover.

In step (415), new α values are computed based on a pair of slope (k) and sensitivity (p) values and the difference (delta) between the new and old values of interest. For example, in an embodiment $$a_v = g(\text{delta}) = \frac{1}{1 + e^{-k_v * (\text{delta}_v - p_v)}}, \quad (11)$$

where, for v={min, mid, max}, $\text{delta}_v = |\text{new}\_v - v|$. In an embodiment, as an example, and without limitation, slope and sensitivity values for typical metadata parameters may be given by the following Table:

| v (metadata parameter) | k (slope) | p (sensitivity) |
|---|---|---|
| min | 8.0 | 0.5 |
| mid (average) | 16.0 | 0.25 |
| max | 8.0 | 0.5 |

For equation (11), without limitation, it is assumed that input pixel values are normalized to be between 0 and 1, and default alpha values are equal to ½.

As discussed earlier, if available, external triggers (104) may be used to force a reset (340) of the temporal filtering when a scene-change is known, such as a cut to a commercial, or when streaming a pre-packaged movie. In gaming, an external trigger may be when the game switches to pre-produced, or interstitial, video.

In some embodiments, the logistics function may be replaced by other known in the art classifiers, such as any one of the generalized linear models, least square fits, Bayesian approaches, or Poisson regression.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to backlight control and display mapping processes, such as those described herein. The computer and/or IC may compute any of a variety of parameters or values that relate to backlight control and display mapping processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to backlight control and display mapping processes as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to efficient backlight control and display mapping processes are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for filtering frame-related metadata in a video sequence with a processor, the method comprising:
    accessing with a processor an input video stream comprising video frames;
    accessing a first metadata value related to pixels values of the input video stream;
    for a current frame in the input video stream:
        computing a current frame parameter value based on pixel values in the current frame;
        computing a delta value based on the current frame parameter value and the first metadata value;
        computing using a logistic function a filtering coefficient for a temporal filter based on the delta value, a slope value, and a sensitivity value;
        applying the temporal filter to the current frame parameter value to generate an updated metadata value based on the first metadata value, the current frame parameter, and the filtering coefficient, wherein the temporal filter comprises an exponential moving average filter, and computing an output $S_t$ with the exponential moving average filter comprises:

$S_0 = L_{F(0)}$, for $t=0$ $S_t = \alpha * L_{F(t)} + \beta * S_{t-1}$, for $t>0$ where $\alpha$ and $\beta$ denote weight factors and $L_{F(t)}$ denotes the current frame parameter value.

2. The method of claim 1, wherein the delta value comprises the absolute value of the difference between the first metadata value and the current frame parameter.

3. The method of claim 1, further comprising replacing the first metadata value with the updated metadata value.

4. The method of claim 1, wherein the first metadata value is generated by an image analysis processor (105) based on luminance values of the video frames in the input video stream.

5. The method of claim 4, wherein the first metadata value comprises one of min, mid, or max luminance values of the input video stream.

6. The method of claim 1, wherein computing α comprises
    computing $$\alpha = g(\text{delta}) = \frac{1}{1 + e^{-k*(delta-p)}},$$

where g denotes the logistic function, delta denotes the delta value, k denotes the slope value, and p denotes the sensitivity value.

7. The method of claim 1, wherein $\alpha=1-\alpha$.

8. The method of claim 1, further comprising:
    adjusting the current frame parameter value based on characteristics of a target display.

9. The method of claim 8, wherein the characteristics of the target display comprise a minimum and a maximum brightness value of the display.

10. The method of claim 9, wherein adjusting the current frame parameter comprises setting its value to $$Tav = \frac{T_U + T_L}{2}$$

if it is larger than Tav, wherein $T_U$ denotes the maximum brightness of the target display and $T_L$ denotes the minimum brightness of the target display.

11. The method of claim 9, wherein adjusting the current frame parameter comprises setting its value to $$Tav = \frac{T_U + T_L}{2}$$

if it is smaller than Tav, wherein $T_U$ denotes the maximum brightness of the target display and $T_L$ denotes the minimum brightness of the target display.

12. The method of claim 1, wherein memory related to past values of the temporal filter is reset when the current frame is determined to be in a new scene.

13. The method of claim 1, wherein the filtering coefficient for the temporal filter is reset to a predetermined value when the current frame is determined to be in a new scene.

14. The method of claim 1, further comprising:
    determining an instantaneous dynamic range for a target display based on the updated metadata value and one or more limit luminance values for the target display;
    determining a backlight level value for the target display based on the instantaneous dynamic range value; and
    generating an output tone-mapped frame by mapping the dynamic range of the current frame to the target display operating at the backlight level value.

15. A non-transitory computer-readable storage medium having stored thereon computer-executable instruction for executing a method with one or more processors in accordance with the method of claim 1.

* * * * *